United States Patent
Banno et al.

(10) Patent No.: US 7,226,023 B2
(45) Date of Patent: Jun. 5, 2007

(54) CLIP

(75) Inventors: Yoshikazu Banno, Nagoya (JP); Noboru Yano, Kariya (JP); Toshitsugu Shimizu, Kariya (JP); Nobuyuki Donkai, Kariya (JP)

(73) Assignee: NIFCO Inc., Yokohama-shi, Kanagawa (JP)

( * ) Notice: Subject to any disclaimer, the term of this patent is extended or adjusted under 35 U.S.C. 154(b) by 27 days.

(21) Appl. No.: 11/146,058

(22) Filed: Jun. 7, 2005

(65) Prior Publication Data

US 2006/0032031 A1 Feb. 16, 2006

(30) Foreign Application Priority Data

Jun. 14, 2004 (JP) ............... 2004-176005

(51) Int. Cl.
*F16B 15/00* (2006.01)

(52) U.S. Cl. ............... 248/71; 24/453; 24/297; 24/704.1; 296/97.9; 296/214; 403/6; 403/19; 403/20; 403/397; 403/408.1

(58) Field of Classification Search ............... 411/508, 411/913; 24/297, 453, 456, 704.1, 704.2; 296/214, 97.9; 248/71, 220.31, 221.11, 222.13, 248/316.7; 403/6, 19, 20, 397, 408.1; 224/313, 224/544, 556, 557

See application file for complete search history.

(56) References Cited

U.S. PATENT DOCUMENTS

| 6,336,768 B1* | 1/2002 | Kraus ............... 403/408.1 |
| 6,513,772 B2* | 2/2003 | McNeese et al. ...... 248/231.91 |
| 2004/0136812 A1* | 7/2004 | Kawai et al. ............ 411/508 |

FOREIGN PATENT DOCUMENTS

| JP | 06-643 | 1/1994 |
| JP | 2002-065980 | 3/2002 |

* cited by examiner

*Primary Examiner*—Ramon O Ramirez
(74) *Attorney, Agent, or Firm*—Manabu Kanesaka (57) ABSTRACT

A clip includes a flange part capable of face-contacting a periphery part of an opening formed in an attachment member, and a main body part provided on the flange part and inserted into the opening. A locking claw is formed on the main body part to be inserted into an attachment hole formed in an attachment receiving member to which the attachment part is attached for locking on a peripheral part of the attachment hole. An operation piece extends from the locking claw for converting a pressing force pressed by a tool inserted into an operation hole formed in the flange part into a force causing the locking claw to be unlocked from the peripheral part of the attachment hole.

10 Claims, 8 Drawing Sheets

CLIP

BACKGROUND OF THE INVENTION AND RELATED ART STATEMENT

The present invention relates to a clip for attaching an attachment member to an attachment receiving member such that the attachment member can be removed from the attachment receiving member.

Figure 8:
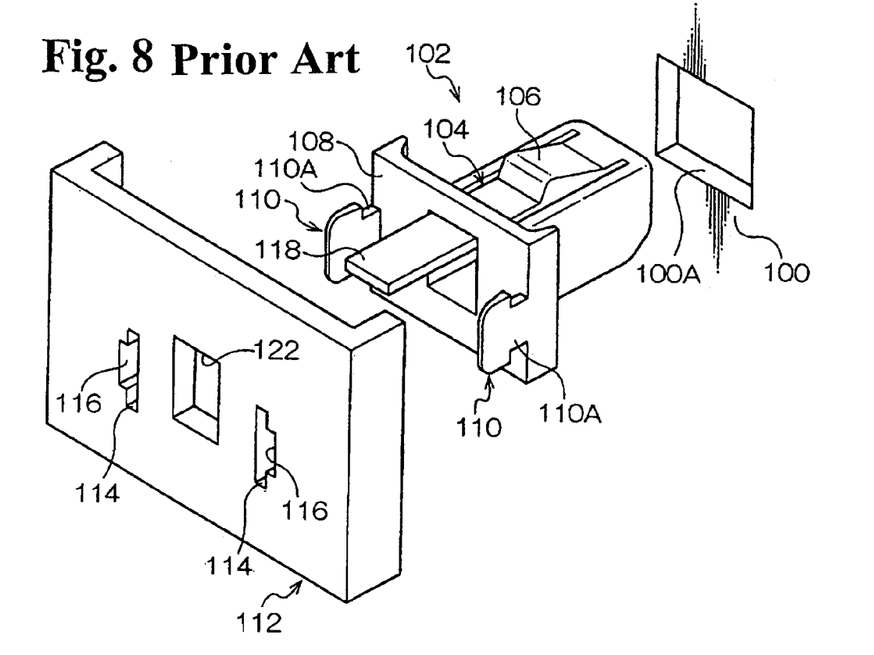
FIG. 8 is an exploded perspective view showing a conventional clip.

A coupling member such as a clip is often used for attaching an attachment member to an attachment receiving member. For example, in Japanese Utility Model Publication (Kokoku) No. 06-643, a claw part 106 of a locking part 104 provided on one end of a clip 102 is locked in a state being placed in contact with a peripheral part of an opening 100A formed in an attachment receiving member 100, as shown in FIG. 8.

A stand 108 is provided on the other end of the clip 102, and a pair of coupling pieces 110 is placed upright on the stand 108. Insert-through holes 114 are formed in the attachment member 112 for inserting the coupling pieces 110, and coupling holes 116 having a width smaller than that of the insert-through holes 114 are formed outside the insert-through holes 114 in a state connecting with the insert-through holes 114. A head part 110B of the coupling piece 110 contacts a peripheral part of the coupling hole 116 in a state in which a neck part 110A of the coupling piece 110 is placed inside the coupling hole 116, and the coupling piece 110 is locked on a periphery of the coupling hole 116.

The attachment member 112 is attached to the attachment receiving member 100 with the clip 102 in a state in which the claw part 106 is locked to the attachment receiving member 100 and the coupling pieces 110 are locked to the attachment member 112.

An operation piece 118 extends from an upper surface of the claw part 106 toward the stand 108, and passes through a hole part 120 formed in the center part of the stand 108. An operation hole 122 is formed between the insert-through holes 114 of the attachment member 112, and the operation piece 118 is exposed from the operation hole 122 in a state in which the clip 102 is attached to the attachment member 112.

When the operation piece 118 is moved following the operation hole 122, the locking part 104 of the claw part 106 bends inwardly. Also, the claw part 106 is unlocked from the peripheral part of the opening 10A, and the opening 10A becomes capable of inserting therethrough. In this state, when the clip 102 is pulled away from the attachment receiving member 100, the claw part 106 is inserted into the opening 10A, and the clip 102 is removed from the attachment receiving member 100.

When the pair of coupling pieces 110 is moved in the direction of approaching each other, the coupling pieces 110 are placed inside the insert-through holes 114. In this state, when the attachment member 112 is pulled, the coupling pieces 110 escape from the pass-through holes 114, and the attachment member 112 is removed from the clip 102.

Accordingly, the attachment receiving member 100, clip 102, and attachment member 112 are capable of attachment and removal, respectively. It is necessary to provide the operation hole 122 and insert-through holes 114 in the attachment member 112, thereby deteriorating appearance. The operation piece 118 is exposed from the operation hole 122, so that the operation piece 118 may be operated erroneously to remove the clip 102 from the attachment receiving member 100.

Figure 9:
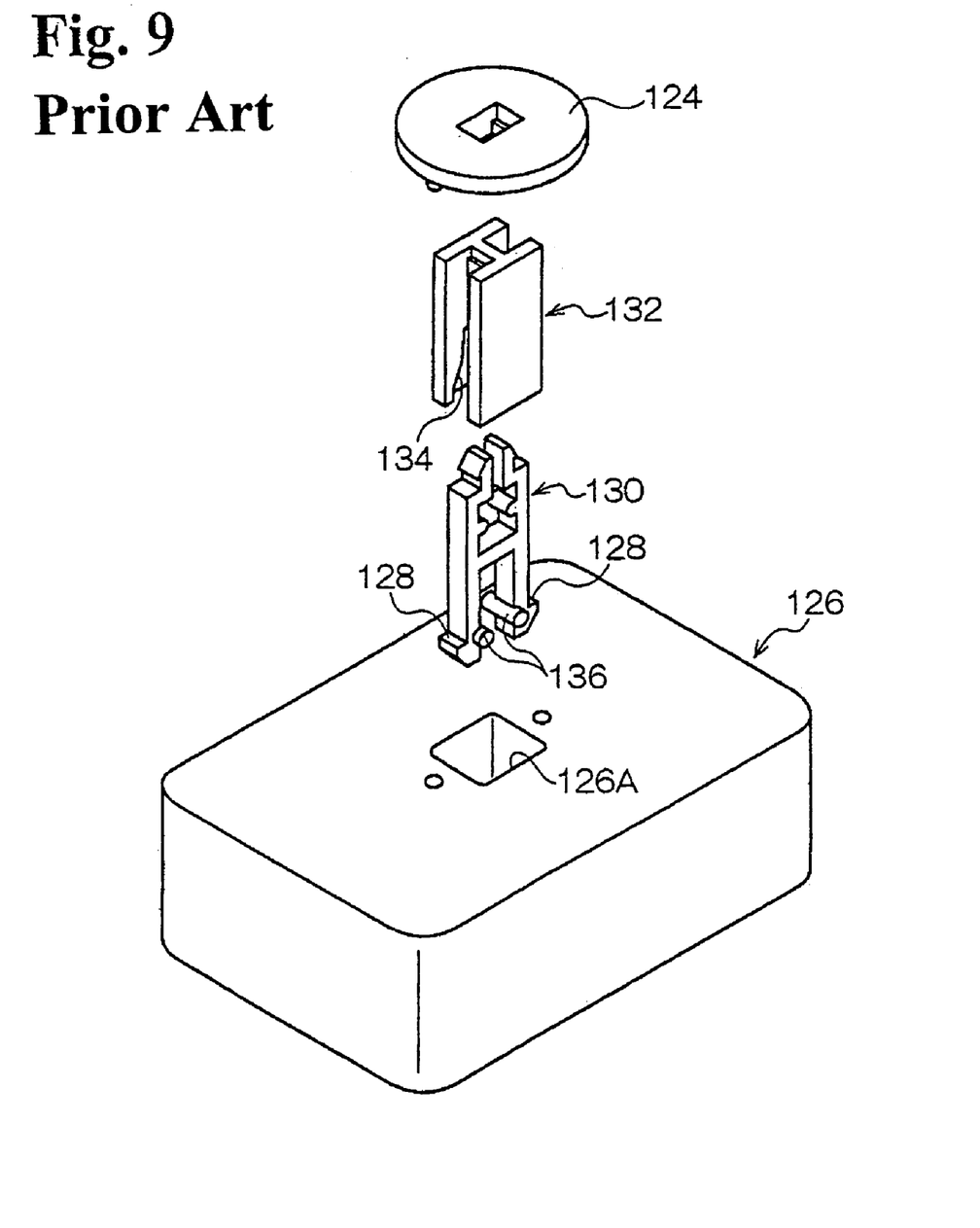
FIG. 9 is an exploded perspective view showing another conventional clip.
Figure 10:
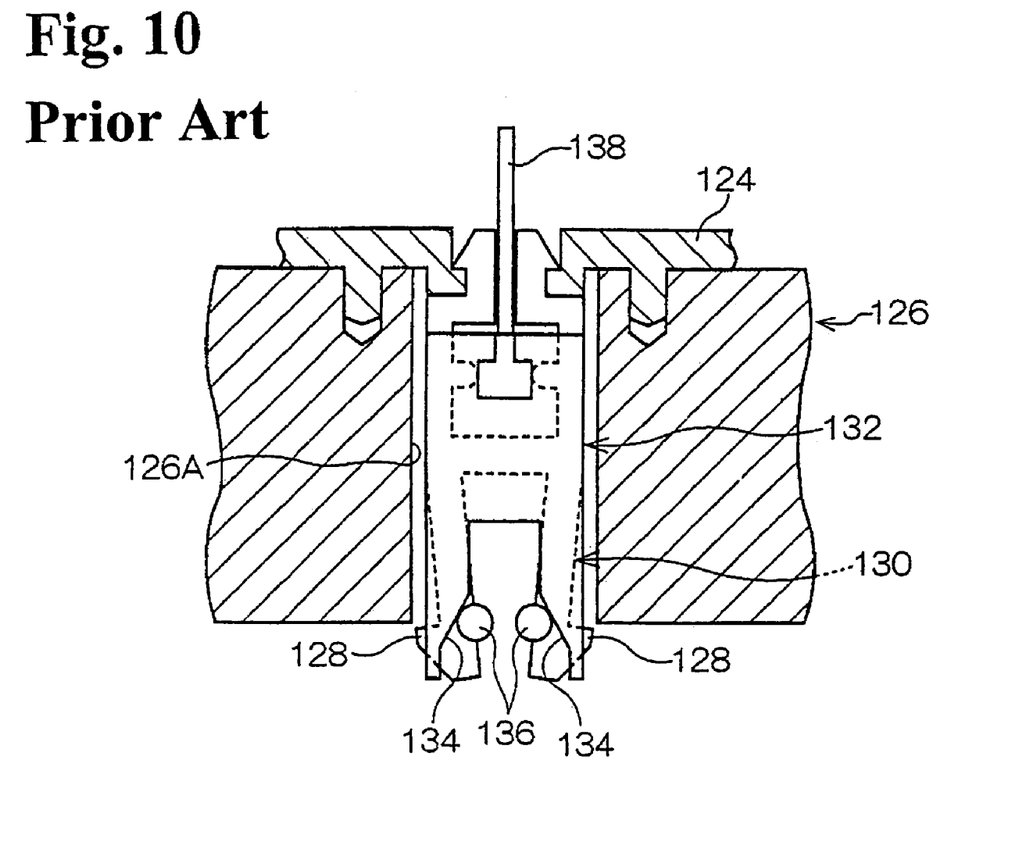
FIG. 10 is a sectional view showing the conventional clip in FIG. 9.

In Japanese Patent Publication (Kokia) No. 2002-65980, a coupling member 130 having locking claw parts 128 for locking on a peripheral part of an attachment hole 126A of an attachment receiving member 126 is coupled on an underside of an attachment base 124 to which an attachment member (not illustrated) is capable of attachment, as shown in FIG. 9 and FIG. 10. Accordingly, the attachment member becomes capable of attachment to the attachment receiving member 126 by the coupling member 130 and the attachment base 124.

An uncoupling member 132 having about the same length as the coupling member 130 is coupled to the coupling member 130 for sliding along a longitudinal direction of the coupling member 130. On the uncoupling member 132, sloping cams 134 are formed on sides of the locking claw parts 128 of the coupling member 130. When the uncoupling member 132 is pressed to slide against the coupling member 130, two ends of the uncoupling projections 136 protruding from a backside of the locking claw parts 128 are pressed in the direction of approaching each other in a state of contacting the sloping cams 134. Accordingly, the locking claw parts 128 are unlocked from the peripheral part of the attachment hole 126A.

The sloping cams 134 converts the force causing the uncoupling member 132 to slide against the coupling member 130 into a force causing the locking claw parts 128 of the coupling member 130 to contract in a diameter. Accordingly, the locking claw parts 128 can be unlocked from the peripheral part of the attachment hole 126A just by pressing the uncoupling member 132.

The uncoupling member 132 is pressed by a pin 138 and the like. Accordingly, it is sufficient to provide a hole having a size capable of inserting the pin 138 in the attachment base 124, thereby improving appearance. In such a constitution, however, the number of parts increases, thereby increasing cost.

SUMMARY OF THE INVENTION

In order to attain the objects described above, according to a first aspect of the present invention, a clip comprises: a flange part capable of face-contacting a peripheral part of an opening formed in an attachment member; a main body part provided on the flange part and inserted into the opening; a locking claw formed on the main body part and inserted into an attachment hole formed in an attachment receiving member to which the attachment part is attached for locking on a peripheral part of the attachment hole; and an operation piece extending from the locking claw for converting a pressing force pressed by a tool inserted into an operation hole formed in the flange part into a force causing the locking claw to be unlocked from the peripheral part of the attachment hole.

In the first aspect of the invention, the flange part is formed on the clip for face-contacting the opening formed in the attachment member. The main body part inserted into the opening is formed on the flange part, and the locking claw is formed on the main body part. The locking claw is inserted into the attachment hole formed in the attachment receiving member for locking on the peripheral part of the attachment hole. The operation piece extends from the locking claw for converting the pressing force pressed by the tool inserted into the operation hole formed in the flange part into the force causing the locking claw to move in a direction of being unlocked from the peripheral part of the attachment hole.

The locking claw is unlocked from the peripheral part of the attachment hole by just pressing the operation piece. A size of the operation hole can be made smaller compared with a case in which a locking claw is unlocked from a peripheral part of an attachment hole by directly bending inwardly. Accordingly, in terms of appearance, the operation hole does not stand out, thereby improving the appearance. Also, the operation piece extends from the locking claw and is integrated with the locking claw, thereby reducing the number of parts and cost.

According to a second aspect of the present invention, in the clip in the first aspect, a pair of locking claws projects in opposite directions, and the operation pieces extend toward the flange part and intersect inside the main body part. Accordingly, when the intersecting part of the operation pieces is pressed by a front end part of a tool, the two operation pieces can be operated simultaneously. That is, it is possible to simultaneously unlock the locking claws from the peripheral part of the attachment hole with the operation pieces through a single operation, thereby improving operability.

According to a third aspect of the present invention, in the clip in the second aspect, upright walls are provided on front end sides of the operation pieces in parallel with a axial line of the main body part for guiding the tool in between. Accordingly, it is possible to guide a front end part of the tool so as not to escape (slip) when the front end part of the tool contacts the operation pieces.

According to a fourth aspect of the present invention recited, in the clip in one of the first to third aspects, the operation pieces intersect on an imaginary sectioning plane sectioning the main body part symmetrically left and right. Accordingly, it is possible to uniformly move the locking claws with the operation pieces against a pressing force of the tool.

According to a fifth aspect of the present invention, in the clip in the fourth aspect, the operation hole is provided in the imaginary sectioning plane. Accordingly, the front end part of the tool inserted into the operation hole contacts at a position of intersection of the operation pieces. Accordingly, in addition to the effect of the second aspect, the pressing force of the tool is applied uniformly to each of the operation pieces.

According to a sixth aspect of the present invention, in the clip in one of the first to fifth aspects, the operation piece contacts the tool on a plane having a downward slope. Accordingly, the pressing force received by the tool is distributed, and a force can be applied in a direction perpendicular to the pressing force. Therefore, it is possible to unlock the locking claw from the peripheral part of the attachment hole with a small pressing force compared with a case in which a contact plane extends horizontally.

According to a seventh aspect of the present invention, in the clip in one of the first to sixth aspects, the locking claw comprises a locking piece rotating around the front end part of the main body part in an insertion direction, and a claw part formed on the locking piece for locking in the attachment hole. The upper surface of the claw part is formed such that a distance from the rotational center of the locking piece becomes about equal. Accordingly, when the claw part is unlocked from the peripheral part of the attachment hole, the rotational movement of the locking piece is not restricted by the upper surface of the claw part contacting the peripheral part of the attachment hole.

According to an eighth aspect of the present invention, in the clip in one of the first to seventh aspects, a hook part is provided on a top side of the flange part for hanging a hung member, so that the clip can be applied to a hook.

According to a ninth aspect of the present invention, in the clip in the eighth aspect, a line joining the intersection of the operation pieces and the operation hole is inclined with respect to the axial line of the main body part. Accordingly, the tool is inserted diagonally to the axial line. That is, the operation hole is placed in a place away from the axial line of the main body part. Therefore, it is possible to attach the base part of the hook part to the top side of the flange part following the axial line of the main body part. Also, the hook part does not become an obstacle when operating the tool.

In the first aspect, the locking claw is unlocked from the peripheral part of the attachment hole by just pressing the operation piece, thereby reducing the size of the operation hole compared with the case in which the locking claw is unlocked from the peripheral part of the attachment hole by directly bending inwardly. Accordingly, in terms of external appearance, the operation hole can be made not to stand out, and the appearance can be improved. Also, the operation piece extends from the locking claw and is integrated with the locking claw, thereby reducing the number of parts and cost.

In the second aspect, the pair of locking claws can be unlocked simultaneously from the peripheral part of the attachment hole by means of the operation pieces with one operation, thereby improving operability. In the third aspect, the front end part of the tool is guided so that the front end part of the tool does not escape (does not slip) when the front end part of the tool contacts the operation pieces.

In the fourth aspect, the amount of movement of the locking claws moved by means of the operation pieces can be made uniform over the pressing force from the tool. In the fifth aspect, the front end part of the tool inserted into the operation hole contacts at the intersection of the operation pieces. Accordingly, in addition to the effect of the second aspect, the pressing force of the tool is applied uniformly to each of the pair of operation pieces.

In the sixth aspect, the pressing force received by the tool is distributed, and the force can be applied in the direction perpendicular to that pressing force. Accordingly, the pressing force necessary to unlock the locking claw from the peripheral part of the attachment hole can be made smaller compared with the case in which the plane of contact is a horizontal plane. In the seventh aspect, when the claw part is unlocked from the peripheral part of the attachment hole, the rotational movement of the locking piece is not restricted by the upper surface of the claw part contacting the peripheral part of the attachment hole.

In the eighth aspect, the clip can be applied to a hook. In the ninth aspect, the position of the operation hole is placed in a place away from the axial line of the main body part. Accordingly, it is possible to attach the base part of the hook part to the top side of the flange part following the axial line of the main body part. Also, the hook part does not become an obstacle when operating the tool.

DETAILED DESCRIPTION OF PREFERRED EMBODIMENTS

Hereunder, embodiments of the present invention will be explained with reference to the accompanying drawings.

Figure 1:
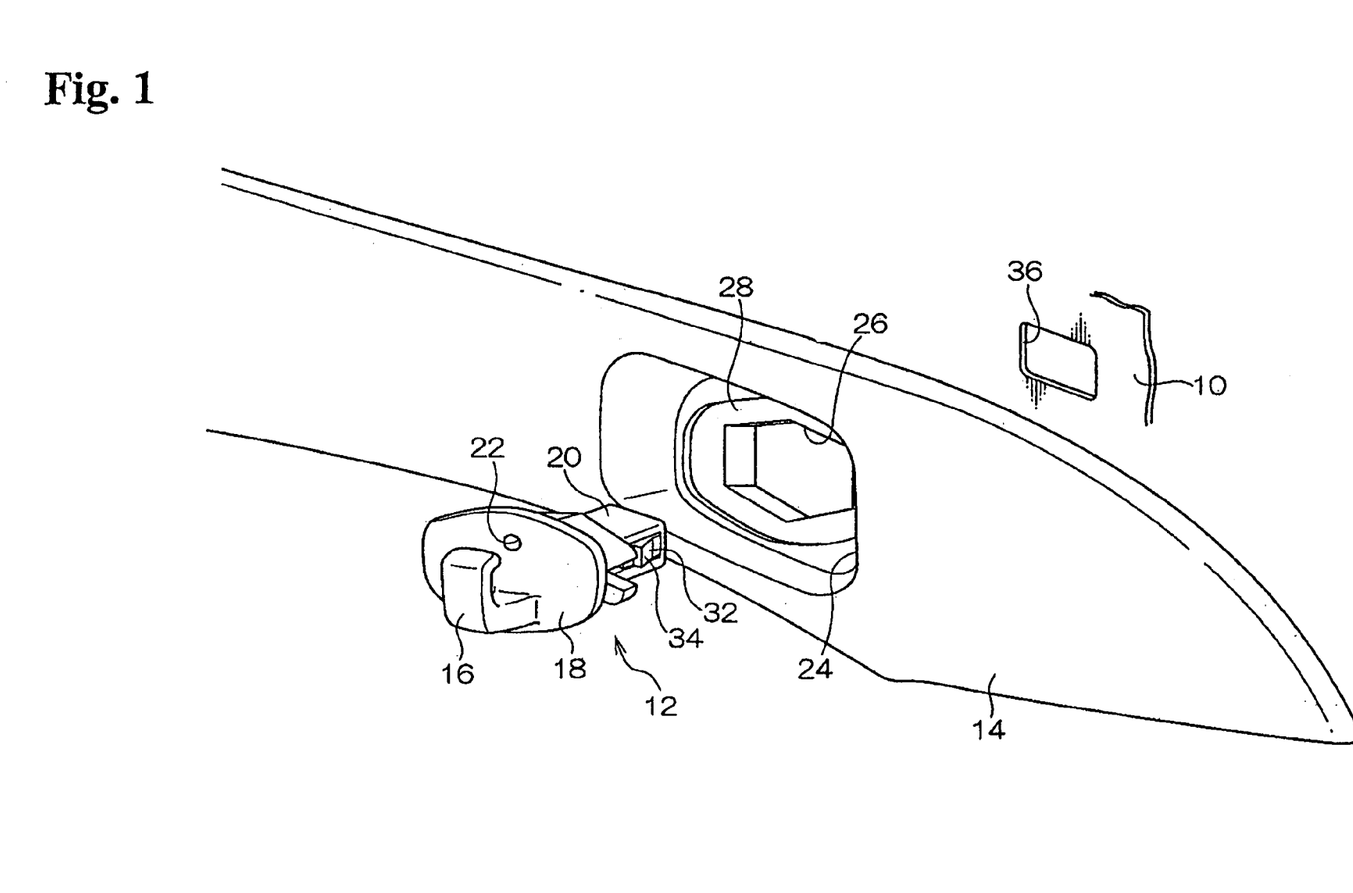
FIG. 1 is an exploded perspective view showing a clip according to an embodiment of the present invention.
Figure 2:
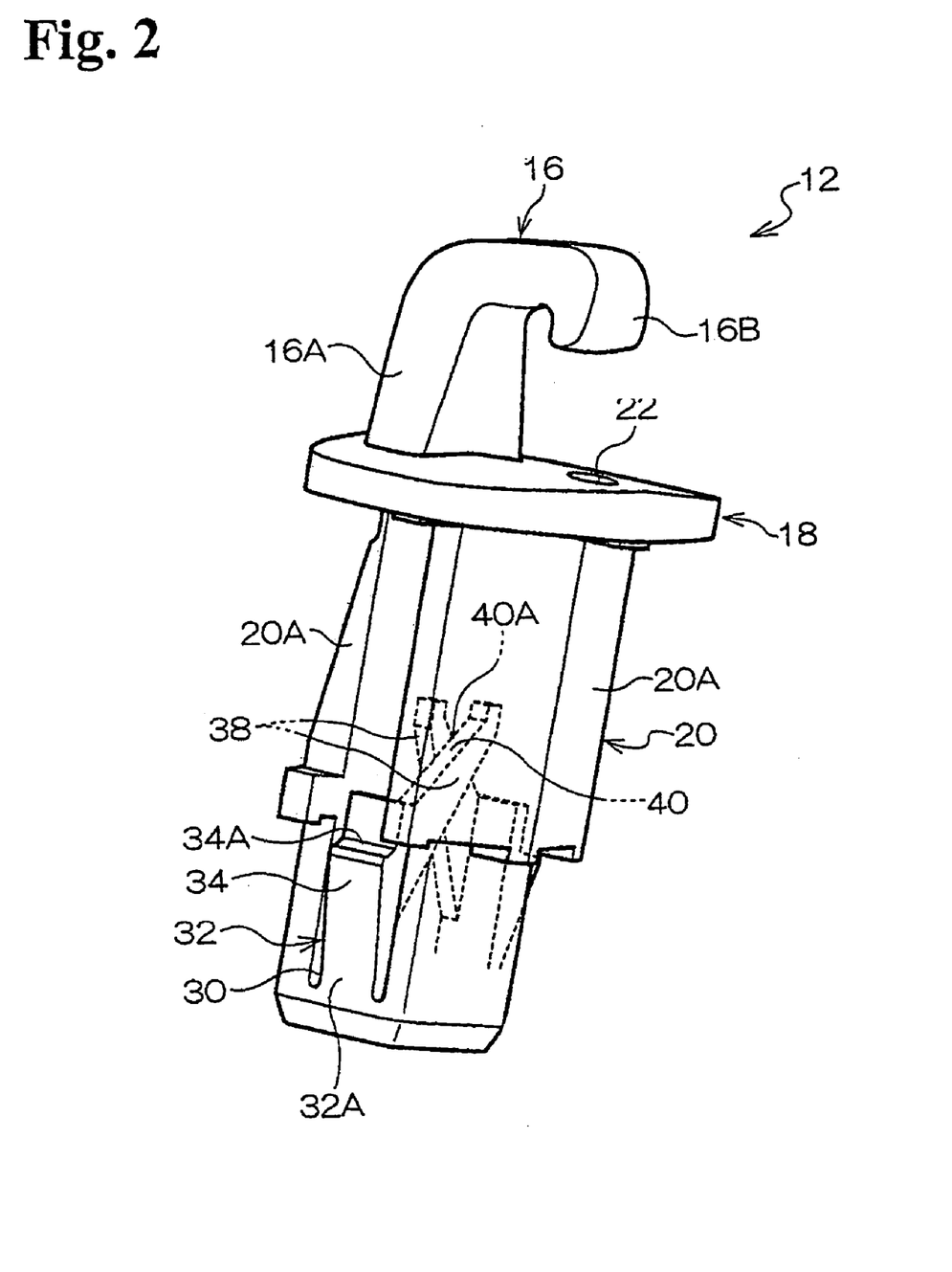
FIG. 2 is a perspective view showing the clip according to the embodiment of the present invention.

As shown in FIG. 1, a deck side trim 14 (attachment member) is attached by means of a clip 12 to a body panel 10 (attachment receiving member) inside a luggage room of a vehicle. The clip 12, as shown in FIG. 2, is largely divided into a hook part 16 which is capable of hanging a hung member (not illustrated) such as a hanger; a flange part 18 which is capable of face-contacting the deck side trim 14; and a main body part 20 which is capable of locking on a side of the body panel 10. The hook part 16 is provided on a top side of the flange part 18, and the main body part 20 is provided on the underside of the flange part 18.

The hook part 16 is roughly L-shaped in section, and a stopper 16B which is bent roughly at a right angle toward the side of the flange part 18 and extends out roughly in parallel to the base part 16A of the hook part 16, is provided on the front end part. The base part 16A becomes wider toward the flange part 18 so that it can maintain the strength of the hook part 16. With the stopper 16B, the hung member hung on the hook part 16 does not easily become released from hanging.

The flange part 18 has a roughly hexagonal shape (see FIG. 1), and becomes wider in the direction following the width direction of the base part 16A of the hook part 16. The base part 16A of the hook part 16 is provided on one end side of the center part in the longitudinal direction of the flange part 18, so that the hook part 16 does not stick out from the flange part 18 viewed on the plane.

An operation hole 22 which is capable of being inserted through by an about 2 mm square pin is formed in the flange part 18 in a position corresponding to beneath the stopper 16B viewed on the plane. Furthermore, a roughly square columnar main body part 20 is provided on the underside of the flange part 18, and has a size capable of being inserted through to an opening 26 formed in the bottom part of a recessed part 24 of the deck side trim 14 shown in FIG. 1.

The opening 26 has a roughly hexagonal shape just like the flange part 18, and on the peripheral part of the opening 26, a face contacting part 28 is provided being recessed one level lower than a bottom part of the recessed part 24. The face contacting part 28 has roughly the same shape as the flange part 18. The flange part 18 face-contacts a surface of the face contacting part 28 in a state being received inside the face contacting part 28, and in this state, rattling of the clip 12 is constrained.

A recessed part 24 is provided on the deck side trim 14, and the clip 12 is attached inside the recessed part 24. Accordingly, an amount that the hook part 16 protrudes from the surface of the deck side trim 14 is made smaller in the state in which the flange part 18 is fact-contacting the fact contacting part 28, so that the hook part 16 does not become an obstacle, and in addition, the appearance is made better.

As shown in FIG. 2, on the front end part of the main body part 20, a pair of roughly U-shaped cut-in parts 30 which is open on the front end side of the main body part 20 is provided on opposite side walls, and a locking piece 32 surrounded by the cut-in part 30 becomes capable of rotating centered on a base part 32A. A claw part 34 is provided on a free end side of an outer face of the locking piece 32, and the upper surface 34A of the claw part 34 is made such that a distance from a rotational center of the locking piece 32 becomes about equal in each position of the upper surface 34A.

Figure 3A:
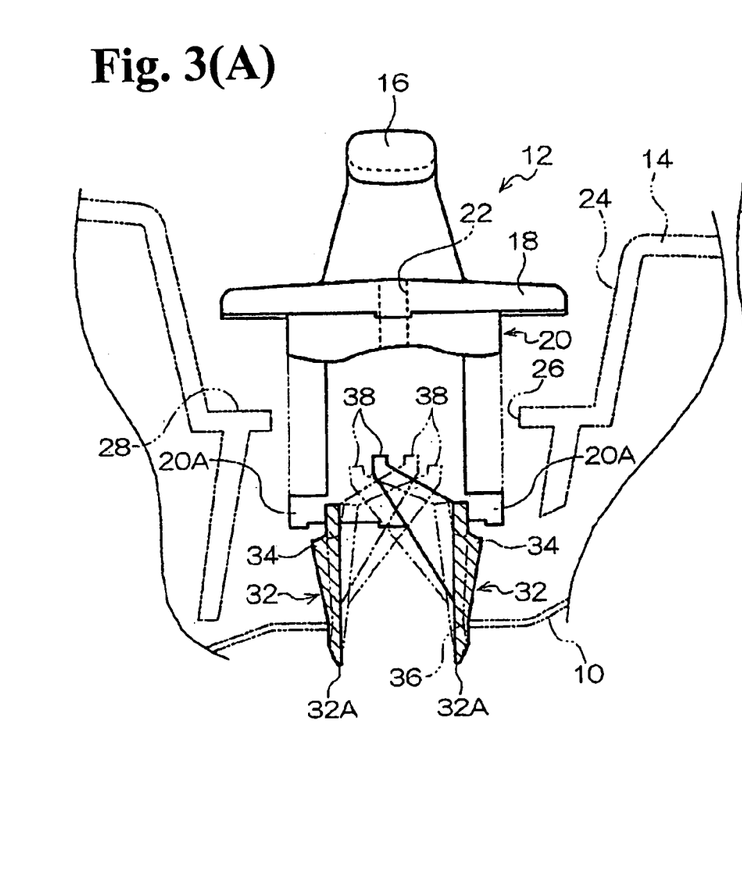
FIGS. 3(A) and 3(B) are sectional views showing the clip in an attached state to a body panel according to the embodiment of the present invention.
Figure 3B:
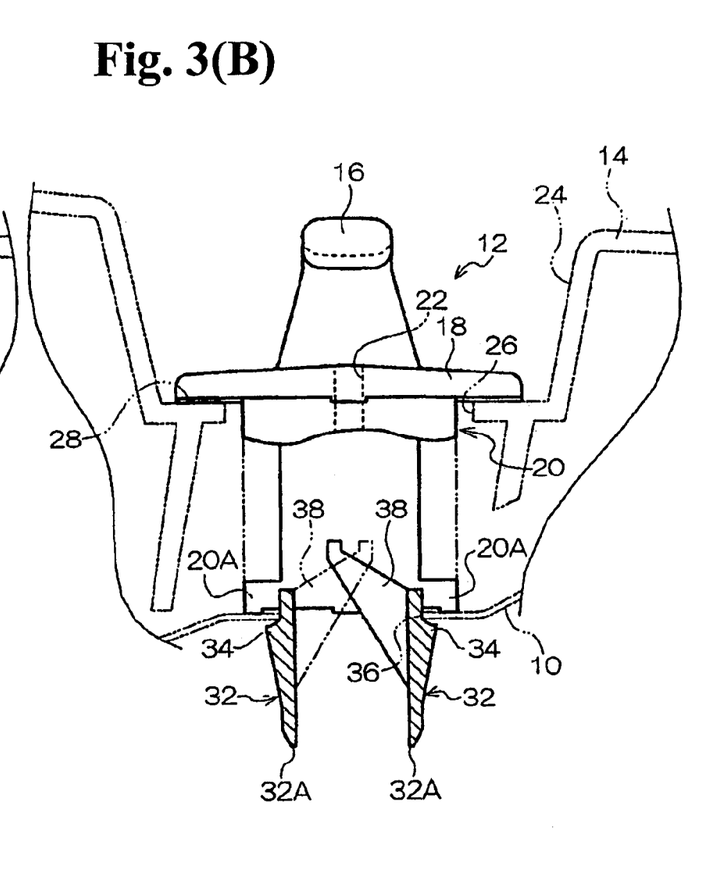

As shown in FIG. 1 and FIG. 3(A), on the body panel 10, a roughly rectangular attachment hole 36 is formed in correspondence with the opening 26 of the deck side trim 14, and has a size capable of being inserted through by the main body part 20. A distance between the claw parts 34 is larger than a width of the attachment hole 36. When the claw parts 34 pass through the attachment hole 36, the claw parts 34 are bent inwardly by the peripheral part of the attachment hole 36, and pass through the attachment hole 36 in a contracted-diameter state. After the claw parts 34 pass through the attachment hole 36, the claw parts 34 return, and as shown in FIG. 3(B), to contact the peripheral part of the attachment hole 36.

In the state in which the main body part 20 passes through the opening 26 of the deck side trim 14 and the attachment hole 36 of the body panel 10, and the claw parts 34 returns, the flange part 18 of the clip 12 face-contacts the face contacting part 28 of the deck side trim 14, and the claw parts 34 contact the peripheral part of the attachment hole 36. In this state, the clip 12 is stopped from escaping, and the deck side trim 14 is attached to the body panel 10.

Figure 5:
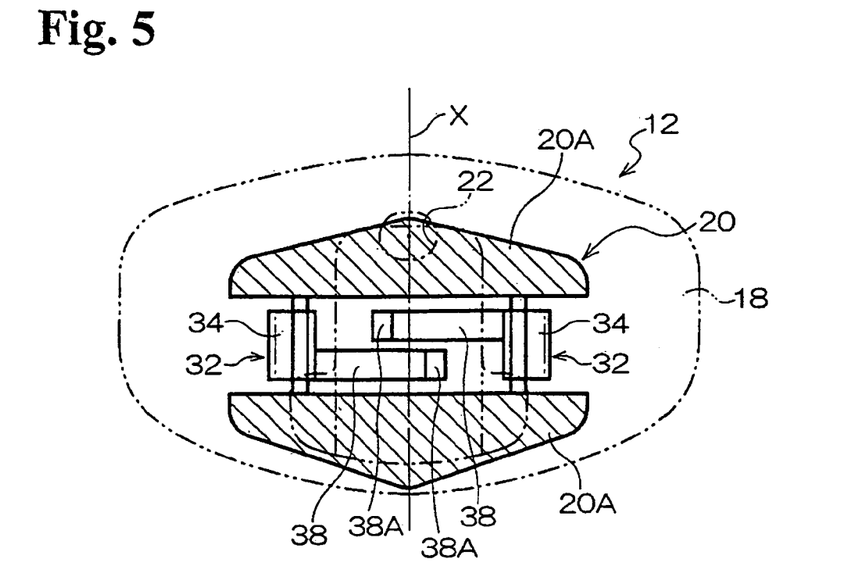
FIG. 5 is a horizontal sectional view showing a positional relationship of an intersecting part of an operation hole and an operation piece of the clip according to the embodiment of the present invention.

As shown in FIG. 5, an outer wall part 20A having a roughly triangular shape in horizontal section is provided on the outer wall of the main body part 20 in a position between the claw part 34 and the flange part 18. As shown in FIG. 3(B), in the state in which the clip 12 is attached to the body panel 10, the bottom face of the outer wall part 20A contacts the peripheral part of the body panel 10 to constrain rattling of the clip 12.

Figure 4A:
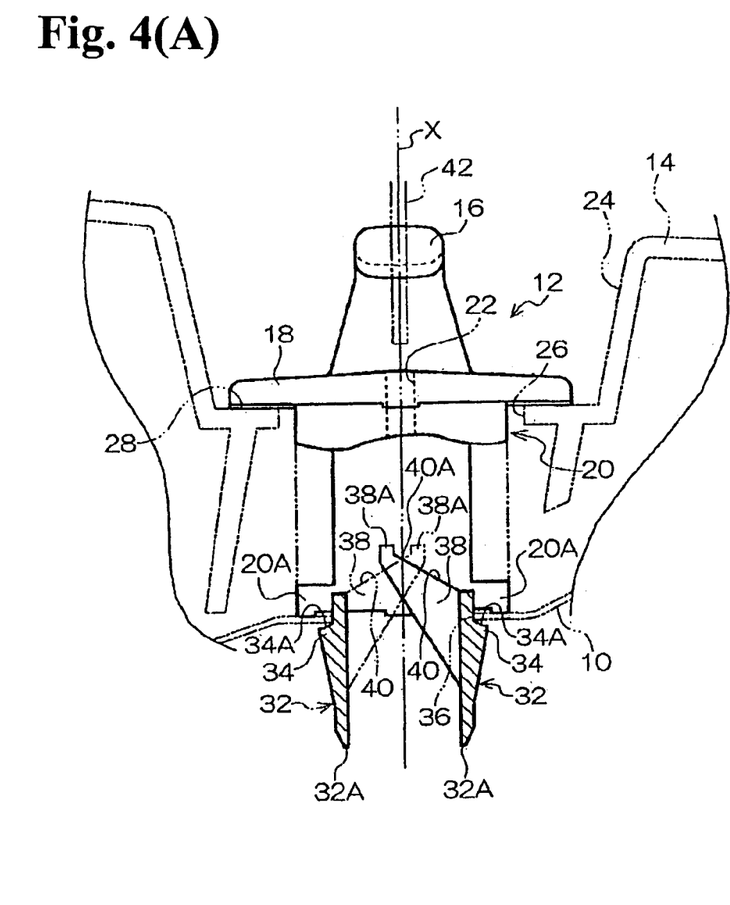
FIGS. 4(A) and 4(B) are sectional views showing the clip in a removed state from the body panel according to the embodiment of the present invention.
Figure 4B:
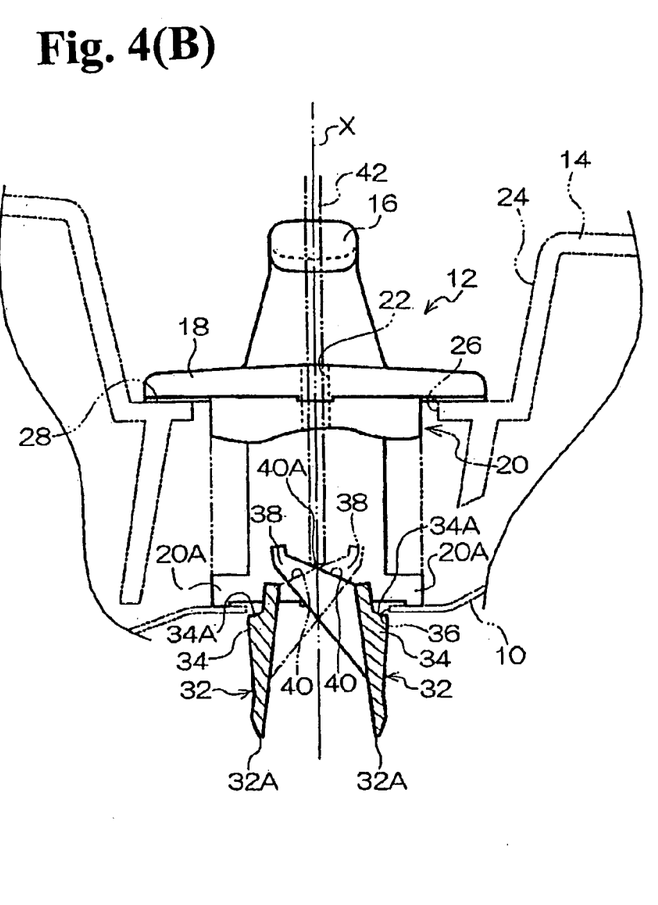

As shown in FIG. 2 and FIGS. 4(A) and 4(B), roughly triangular shaped operation pieces 38 extend out from the free end sides of the inner faces of the locking pieces 32. When the operation pieces 38 are pressed from above, they rotate centered on the base parts 32A of the locking pieces 32, whereby the claw parts 34 can be bent inwardly. The operation pieces 38, as shown in FIG. 2 and FIG. 5, are positioned on one side in the width direction of the locking pieces 32 and extend out toward the flange part 18, so that the operation pieces 38 intersect each other.

Also, sloping faces 40 which go downwardly toward the claw parts 34 are provided on the upper surfaces (plane of contact) of the operation pieces 38. When viewed from the side of the main body part 20 shown in FIG. 4(A), the position where the sloping faces 40 intersect (intersecting part 40A) is taken as an imaginary sectioning plane X which sections the main body part 20 symmetrically left and right.

Figure 6:
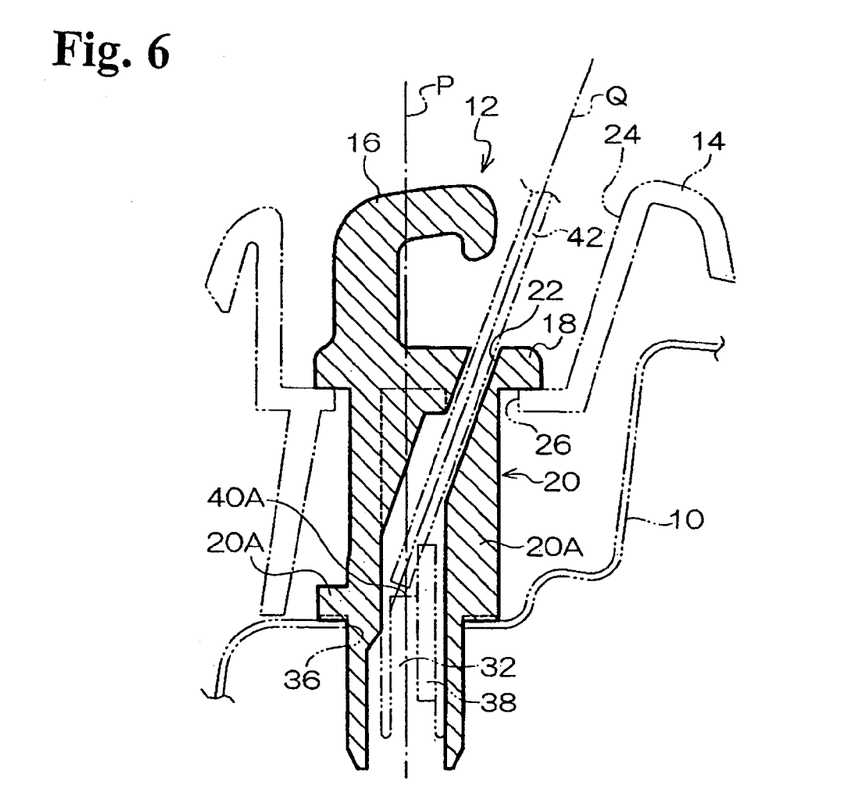
FIG. 6 is a sectional view showing the positional relationship of the operation hole and the operation piece of the clip according to the embodiment of the present invention.

As shown in FIG. 4(A) and FIG. 6, on the front end parts of the operation pieces 38, protruding parts 38A which extend out toward the flange part 18 are provided in parallel with the axial line P (on the imaginary sectioning plane X) of the main body part 20.

The axial line Q (on the imaginary sectioning plane X) of the operation hole 22 formed on the flange part 18 extends out toward the intersecting part 40A of the operation pieces 38, and is inclined with respect to the axial line P of the main body part 20. Therefore, the square pin 42 inserted into the operation hole 22 is guided following the axial line Q toward the intersecting part 40A of the operation pieces 38.

The distance between the inner faces of the protruding parts 38A provided on the respective front end parts of the operation pieces 38 is about 2 mm, and the front end part of the square pin 42 is capable of being placed between the protruding parts 38A. When the square pin 42 is pushed further deeper in the state in which the square pin 42 is placed between the protruding parts 38A of the operation pieces 38, as shown in FIG. 4(B), the operation pieces 38 rotate centered on the bases 32A of the locking pieces 32, and the position of the intersecting part 40A of the operation pieces 38 gradually moves following the sloping faces 40 of the operation pieces 38. In addition, an angle of intersection of the operation pieces 38 gradually becomes larger.

Thus, when the operation pieces 38 rotate centered on the base parts 32A of the locking pieces 32, the claw parts 34 can be bent inwardly by the locking pieces 32, and the locked state between the claw parts 34 and the peripheral part of the attachment hole 36 of the body panel 10 can be released.

Next, an operation of the clip according to the embodiment of the present invention will be explained. When removing the deck side trim 14 shown in FIG. 3(B) from the body panel 10, it is necessary to remove the clip 12 from the body panel 10. Because the claw parts 34 of the clip 12 are locked in a state being in contact with the peripheral part of the attachment hole 36 of the body panel 10, the claw parts 34 must be unlocked from the peripheral part of the attachment hole 36 by bending the locking pieces 32 inwardly.

The operation pieces 38 extend from the free end sides of the inner faces of the locking pieces 32. By pressing the operation pieces 38, the locking pieces 32 are rotated centered on the bases 32A by the operation pieces 38, and the claw parts 34 can be bent inwardly. That is, by the operation pieces 38, as shown in FIGS. 4(A) and 4(B), the pressing force pressed from the square pin 42 can be converted into a force causing the claw parts 34 to move toward the direction of being unlocked from the peripheral part of the attachment hole 36.

Thus, the claw parts 34 are unlocked from the peripheral part of the attachment hole 36 by just pressing the operation pieces 38. Because the size of the operation hole 22 can be made smaller compared with a case in which the claw parts 34 are unlocked from the peripheral part of the attachment hole 36 by directly bending them inwardly, in terms of external appearance, the operation hole 22 can be made not to stand out, and the appearance can be made better. Also, the operation pieces 38 extend outwardly from the locking pieces 32 and are integrated with the locking pieces 32, so that the number of parts can be reduced, and reduction of cost can be devised.

The upper surfaces of the operation pieces 38 contacted by the square pin 42 are the sloping faces 40 which go downwardly toward the claw parts 34. Accordingly, the pressing force received by the square pin 42 is distributed, and force toward a direction perpendicular to the pressing force can be applied. Therefore, the pressing force necessary to unlock the claw parts 34 from the peripheral part of the attachment hole 36 can be made smaller compared with the case in which the upper surfaces of the operation pieces 38 are horizontal planes.

The operation pieces 38 extend out toward the side of the flange part 18 and the sloping faces 40 intersect inside the main body part 20. Accordingly, when the intersecting part 40A of the operation pieces 38 is pressed by the front end part of the square pin 42, the two operation pieces 38 can be operated simultaneously. That is, the operability is good in that the pair of claw parts 34 can be unlocked simultaneously from the peripheral part of the attachment hole 36 by means of the operation pieces 38 with one operation.

The protruding parts 38A are provided in parallel with the axial line P (on the imaginary sectioning plane X) of the main body part 20 on the front end sides of the operation pieces 38 and the square pin 42 is guided between the protruding parts 38A. Accordingly, the front end part of the square pin 42 is guided, so that the front end part of the square pin 42 does not escape (does not slip) when the front end part of the square pin 42 contacts with the operation pieces 38.

The intersecting part 40A of the operation pieces 38 is situated on the imaginary sectioning plane X sectioning the main body part 20 symmetrically left and right when viewed from the side of the main body part 20. Accordingly, the amount of movement of the claw parts 34 moved by the operation pieces 38 can be made uniform over the pressing force from the square pin 42.

The operation hole 22 is provided on the imaginary sectioning plane X, so that the front end part of the square pin 42 inserted into the operation hole 22 contacts the intersecting part 40A of the operation pieces 38. Accordingly, the pressing force of the square pin 42 is applied uniformly to each of the pair of operation pieces 38.

The upper surface 34A of the claw part 34 is formed such that the distance from the rotational center of the locking piece 32 becomes about equal. Accordingly, when the claw part 34 is unlocked from the peripheral part of the attachment hole 36, the rotational movement of the locking piece 32 is not restricted by contacting of the upper surface 34A of the claw part 34 with the peripheral part of the attachment hole 36.

As shown in FIG. 6, the axial line Q joining the intersecting part 40A of the operation pieces 38 and the hole position of the operation hole 22 is inclined with respect to the axial line P of the main body part 20, so that the square pin 42 is inserted diagonally to the axial line P. That is, the position of the operation hole 22 is placed on a place away from the axial line P of the main body part 20. Therefore, it is possible to attach the base part 16A of the hook part 16 to the top side of the flange part 18 following the axial line P of the main body part 20. Also, the hook part 16 does not become an obstacle when operating the square pin 42.

Figure 7:
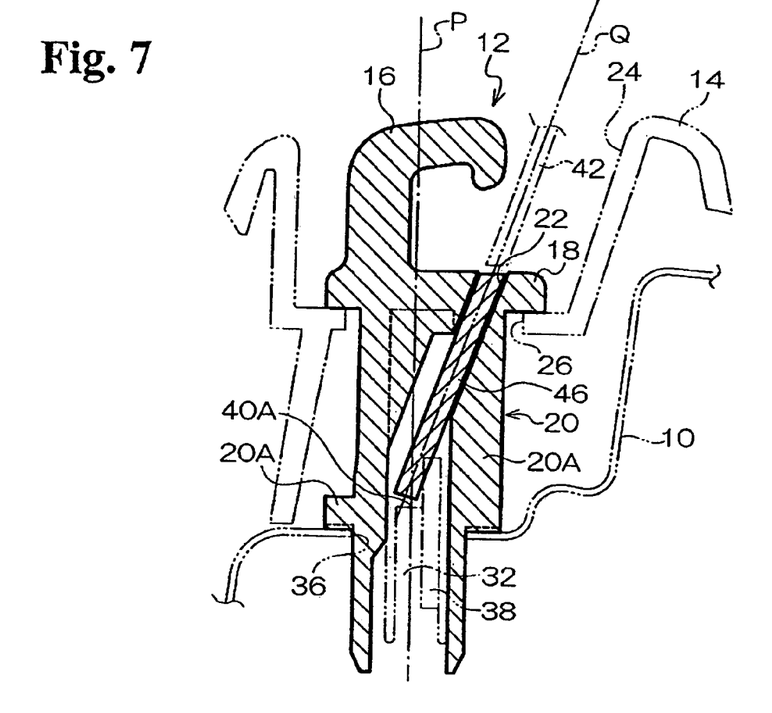
FIG. 7 is a sectional view showing a modified example of the clip according to the embodiment of the present invention.

The present invention is not limited to the embodiments described above. For example, as shown in FIG. 7, the operation pin 46 joining the operation hole 22 and the intersecting part 40A of the operation pieces 38 may be placed to be capable of sliding against the operation hole 22, and the operation pieces 38 are operated by the operation pin 46. In this case, the stroke of the square pin 42 can be made shorter. In addition, because the operation hole 22 can be always closed by the operation pin 46, it is possible to prevent the intrusion of dirt, and the like, from the operation hole 22, and in addition, it is good also in external appearance.

In the present embodiments, the square pin 42 is used as the tool for pressing the operation pieces 38. As far as it is possible to press the operation pieces 38, it is not limited to this, and a round pin, or the like, also may be used. The two locking pieces 32 are provided, and one locking piece 32 may be provided. The hook part 16 is provided on the top side of the flange part 18 and the clip 12 is applied on the hook. The hook part 16 is not absolutely necessary, and just a clip may be provided for attaching the deck side trim 14 to the body panel 10. Furthermore, it is not only a constitution in which the deck side trim 14 is attached to the body panel 10 by means of the clip 12, and for example, it also may be a constitution in which only the clip 12 is attached to the body panel 10 having the deck side trim 14 attached, regardless of the hook part 16.

The disclosure of Japanese Patent Application No. 2004-176005, filed on Jun. 14, 2004, is incorporated in the application.

While the invention has been explained with reference to the specific embodiments of the invention, the explanation is illustrative and the invention is limited only by the appended claims.

What is claimed is:

1. A clip for attaching an attachment member to an attachment receiving member, comprising:
   a flange part for contacting a periphery of an opening formed in the attachment member, said flange part having an operation hole;
   a main body part provided on the flange part to be inserted into the opening;
   a locking claw formed on the main body part to be inserted into an attachment hole formed in the attachment receiving member for locking on a periphery of the attachment hole; and
   an operation piece extending from the locking claw for releasing the locking claw from the periphery of the attachment hole when a tool inserted into the operation hole presses the operation piece.

2. A clip according to claim 1, wherein said locking claw includes a pair of claw portions projecting in opposite directions, said operation piece including operation portions extending from the claw portions toward the flange part and intersecting with each other in the main body part.

3. A clip according to claim 2, wherein said operation portions intersect on an imaginary sectioning plane sectioning the main body part symmetrically into a left side and a right side.

4. A clip according to claim 3, wherein said flange part has the operation hole situated on the imaginary sectioning plane.

5. A clip according to claim 2, wherein each of said claw portion includes a locking piece rotatable around a front end of the main body part in a direction that the main body part is inserted into the opening, and a claw part formed on the locking piece for locking in the attachment hole, said claw part having an upper surface equally spaced from a rotational center of the locking piece.

6. A clip according to claim 2, wherein said operation portions intersect on a line extending toward the operation hole and incline relative to an axial line of the main body part.

7. A clip according to claim 2, wherein said operation portions are located inside the main body so that when the operation portions are pushed, the claw portions are moved inwardly.

8. A clip according to claim 1, wherein said operation piece includes an upright wall at a front end thereof extending parallel to an axial line of the main body part for guiding the tool.

9. A clip according to claim 1, wherein said operation piece has a contact plane for contacting the tool, said contact plane having a downward slope.

10. A clip according to claim 1, wherein said flange part further includes a hook part for hanging a hung member.

* * * * *